Nov. 17, 1959   A. STIHL   2,912,968
POWER SAW CHAIN FOR USE ON HARD ROCK
Filed Oct. 22, 1956   3 Sheets-Sheet 1
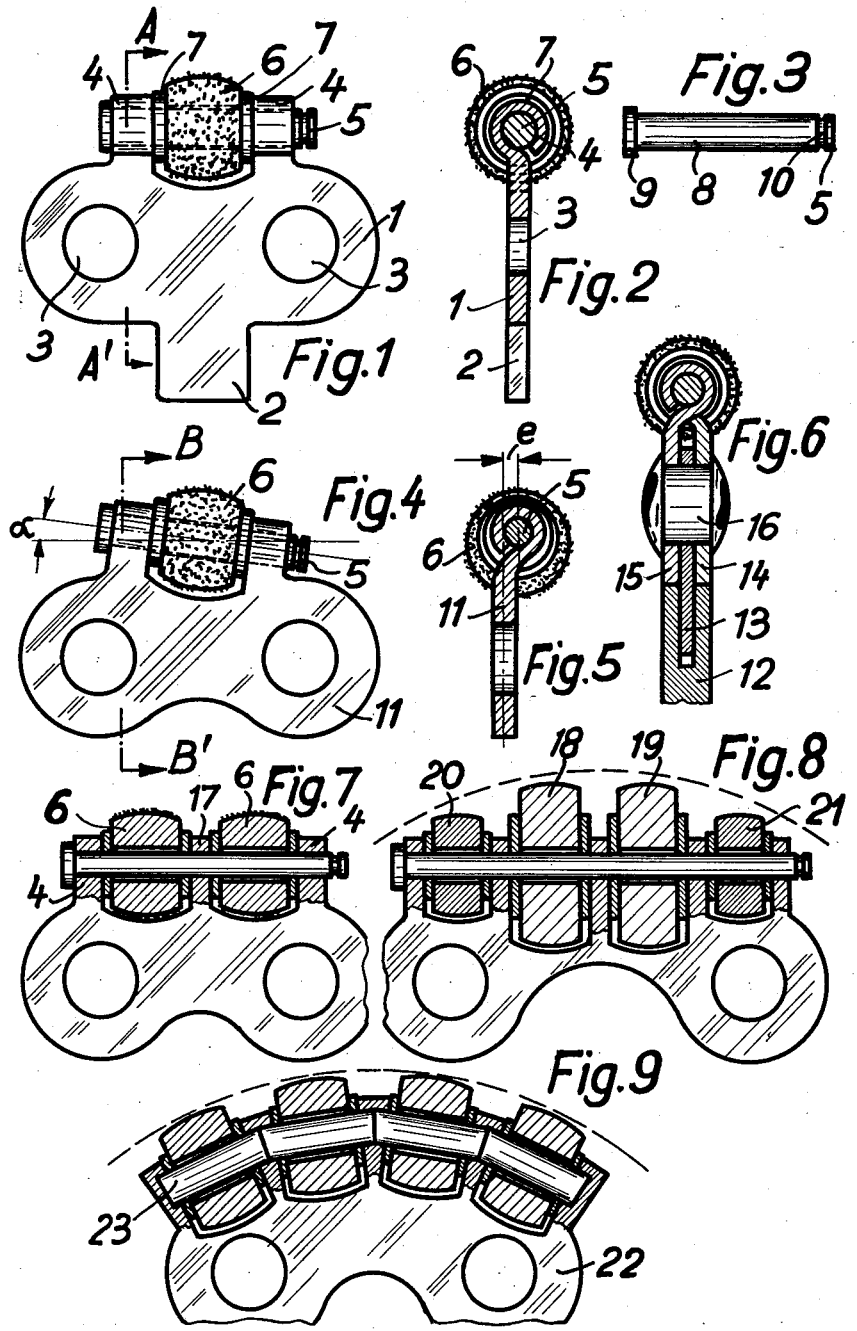
INVENTOR
ANDREAS STIHL Nov. 17, 1959 A. STIHL 2,912,968
POWER SAW CHAIN FOR USE ON HARD ROCK
Filed Oct. 22, 1956 3 Sheets-Sheet 2
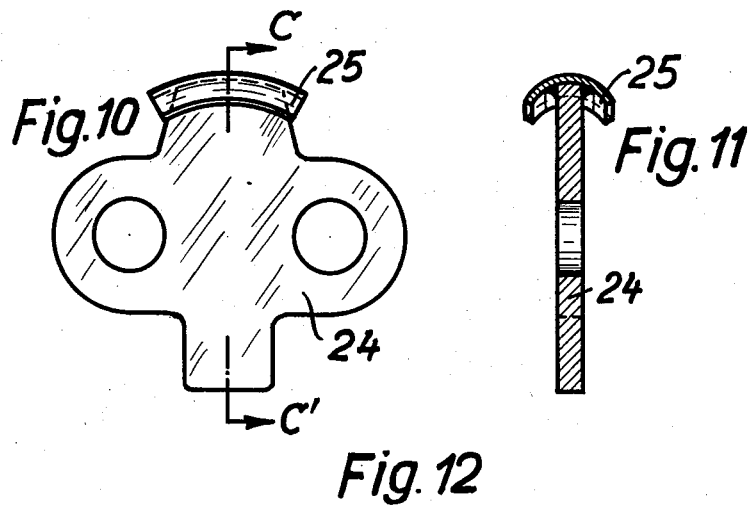
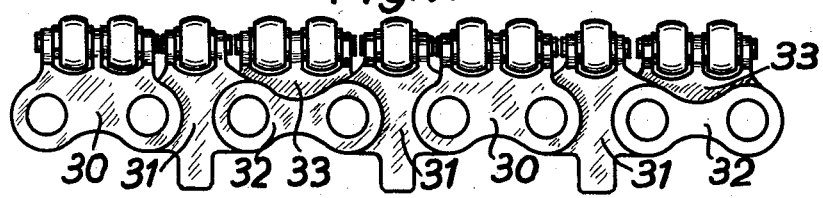
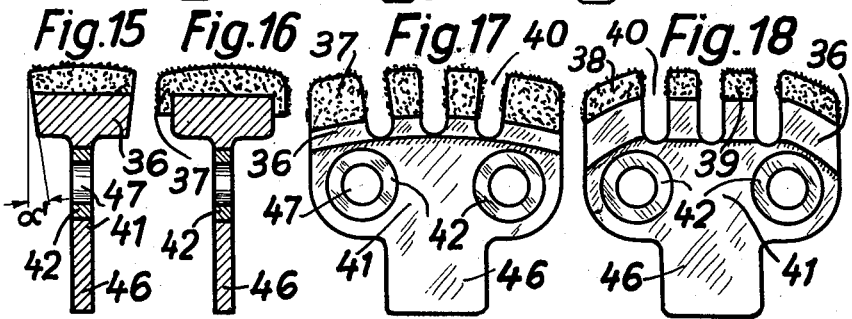
INVENTOR
ANDREAS STIHL Nov. 17, 1959   A. STIHL   2,912,968
POWER SAW CHAIN FOR USE ON HARD ROCK
Filed Oct. 22, 1956   3 Sheets-Sheet 3
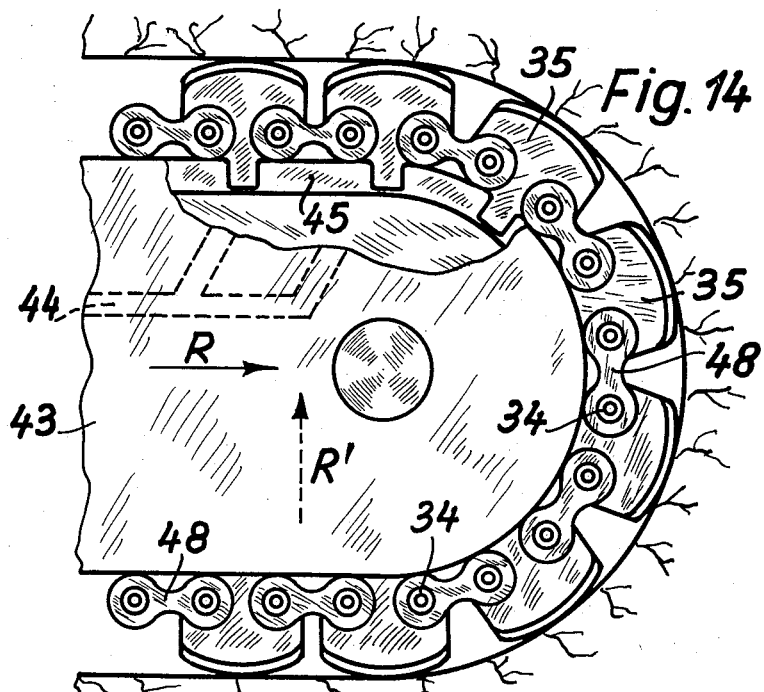
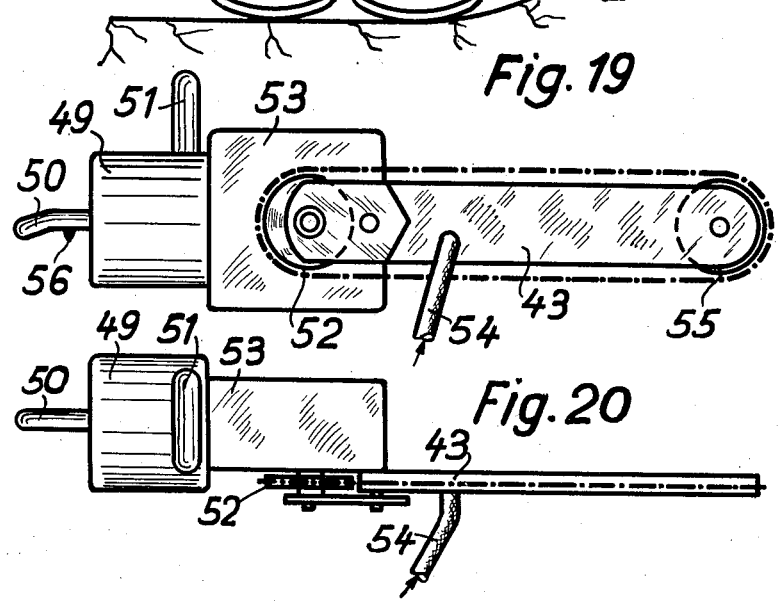
INVENTOR
ANDREAS STIHL
By

2,912,968
POWER SAW CHAIN FOR USE ON HARD ROCK

Andreas Stihl, Neustadt, near Waiblingen, Germany

Application October 22, 1956, Serial No. 617,645

Claims priority, application Germany October 24, 1955

12 Claims. (Cl. 125—21)

This invention relates to power tools, and more particularly to motor-driven chain saws and the like.

Up to now the saw chains of motor-driven chain saws were used mainly for cutting material softer than steel. Consequently, the utility of motor-driven chain saws was limited to the cutting of wood, paper, plastics, etc. Attempts have been made to arm the teeth of saw chains with a hard metal and to use the resulting reinforced saws in the cutting of rock. These saw chains designed for use on rock, however, had teeth of approximately the same design as the teeth of saws employed on wood. Accordingly, these attempts involved cutting a groove in the rock by means of the saw chain, in spite of the fact that rock, and particularly hard rock, is incapable of yielding chips, and, therefore, is a poor material for any chip-raising or chip-tearing tool.

For this reason, motor-driven chain saws have not successfully competed in the treatment of rock, with grinding tools, in spite of their lower weight, the ease of handling, and the possibility of deeply piercing the rock with only a narrow blade.

In the prior art, the opinion prevailed that hard rock is best cut by a grinding tool having a high cutting speed and a low contact pressure, and quite especially a grinding tool armed with the hardest material known, to wit: diamond. In consequence, the cutting of basalt, granite, quartzite and similar hard stone or rock, is most frequently done by means of diamond-armed circular saws or milling cutters or similar tools. With cutting depths of any material penetration, however, these machines are heavy, difficult to handle and particularly expensive.

The prior art has failed to appreciate that motor-driven chain saws can be used not only for sawing, but also for grinding, in which event they are superior to known machines for this purpose, provided, of course, that the saw chain is adapted to the grinding conditions which naturally are completely different from those encountered in planing or sawing.

At first sight, of course, the arming of saw chains with diamonds and the use of the resulting saw chains in grinding, appears most dubious as the usual prerequisites for successful grinding operations seem to be lacking. For instance, the discs mounting the diamonds must not be out of true to a marked extent, and they must run round exactly. Chain members, however, can never be so aligned that they are disposed in the cut groove as precisely as a rigid, firmly clamped blade of a circular saw. Furthermore, the circular saw, once the diameter has been selected, retains always the same tangential position relative to the groove in the rock, with the same radius of curvature. A chain saw, on the other hand, furnishes in the front of the guide rail a plane or at the most mildly arched cut. In contrast hereto, the chain saw, on the guide arch or the guide roller, has a very strong curvature with only a small radius. If the cutting faces of the chain members are adapted to the plane cut in the front of the guide rail, they appear unsuitable for the cut while passing across the guide arch or the guide rail and vice versa. Besides, it is to be expected that the rock dust derived from grinding, penetrates between the sliding surfaces of the saw chain to widen the same and eventually, render the chain useless. Moreover, grinding operations require wetting or flushing with water, to remove the abraded waste, but saw chains operate dry.

It is an object of this invention to resolve the problems enumerated above, and to provide a light-weight, simple and relatively inexpensive power chain saw capable of replacing heavy rock-cutting machines now in use.

Other objects and the manner in which the same are attained, will become apparent as this specification proceeds.

The present invention contemplates to provide the chain members of a saw chain for power chain saws designed to cut and pierce hard rock, with grinding elements, and to form the chain members as supports for the grinding elements. The invention, in fact, does away with any proper saw tooth on the saw chain, replacing it instead with an all-around rounded tooth with an extended and rather broad effective surface or a cutting bead with an abrasive covering, in short by a grinding element with a large polishing surface. The grinding surface is coated with diamond chips or another very hard material, such as carbide granules.

The shape of the grinding surface is so selected that on the one hand, in plane cutting, it is effective over a considerable length and thus deeply penetrates into the grooves in the rock, while on the other hand, in curved cuts, it will nevertheless penetrate not only with one edge but will even here be in contact over a material length with the strongly curved groove in the rock.

The covering does not use a relatively small number of comparatively large diamonds to replace the blades, but uses instead fine diamond grains which are finely subdivided and distributed in a matrix of a different hardness, so that, once the uppermost grinding surface has been worn off, new diamonds thus far embedded underneath form a new surface, a concept already known in connection with diamond grinding discs.

Another feature of the invention involves the supply, through the guide rail to the cut groove, not of lubricant as is customary with motor driven chain saws, but of flushing water, in very considerable quantities. This feature serves the two purposes of cooling the fine cutting points while simultaneously, immediately removing the ground-off rock dust.

The saw chain according to the invention is provided perfectly symmetrical so its disposition on the guide rail may be reversed from time to time. This has the advantage that the grinding surface, which after a certain amount of use becomes dulled and clogged by the deposition of mud, on reversal of the chain position, is automatically resharpened.

The invention further provides space for the deposit of rock dust, not only between the chain members but moreover, in the grinding surfaces proper. This deposit, however, does not adhere and remain in these spaces but in consequence of the very high speed of the saw chain, and the relatively small diameter of the chain drive gear, is certain to be thrown off in the course of every revolution of the chain by the centrifugal force.

The inaccurate alignment of successive chain links, caused by the slight displacement, has an entirely different effect than the diamond-armed disc of a circular saw which is out of true, or does not run round. The failure to run round of such a disc has the result that only a few diamonds are continuously in action, which causes them to overheat and snap off. The mobility of the chain members, on the other hand, insures that during every revolution of the chain, any particular part of the groove is contacted by constantly changing diamonds, The direction of cutting, therefore, changes continuously, and the grinding chain thus acts in the manner of a file where intentionally, after every stroke, the direction of filing is slightly varied in order to enhance the engagement of the material acted upon. Just because of this slight mutual displacement of the individual chain links, the present saw chain cuts the groove somewhat wider than its own width. This prevents the chain saw from jamming, which happens not infrequently in the operation of circular saws. If, according to a modification of the invention, the chain members are provided as supports for cutting beads of the kind known by themselves and including a covering of granular hard metal, the bead is caused to slowly turn continuously, with the result that the hard metal granules which are effective, change continuously. This causes an even, uniform wear of the entire hard exterior of the bead. The novel chain saws of the invention involve no saw tooth which, as the tool holder, might tilt up, and the bead with its round surface rests in the groove in the rock without being able to penetrate into the crevices and holes in the rock.

The mounting and dismounting of the present beads proceeds in a very simple manner, as it merely involves pushing a bolt in or out. Inasmuch as the one-sided tooth blade is replaced, according to the invention, by a spherical area which is symmetrical with respect to the vertical axis, this chain, after a certain time of operation, can be run in reverse direction, which materially increases the life of the chain also with respect to its riveting and other sliding parts.

If the grinding element is provided with a hard metal covering, the invention contemplates going even further and to replace the hard metal covering with its comparatively coarse structure, by a body of finer structure which, however, is still harder than hard metal. According to the invention, the cutting beads are composed of an iron core having a covering of a softer matrix into which most finely grained, extremely hard minerals are embedded. In certain cases, it may be desirable to use a hard metal as this matrix; in other cases, the hard metal may be replaced by a softer metal or another material such as a plastic, as the grinding operation proper no longer is performed by this matrix, but rather by the granules embedded therein. The body of the bead, instead of being made of steel, may consist of another metal or even a plastic.

The invention contemplates to use as the granular material to be embedded in the matrix on the beads, various minerals or synthetic finely grained and particularly hard material, such as, quite especially, carbide. Diamonds are preferred because of their outstanding hardness. A cutting bead provided with a covering including diamonds or a similar, finely grained and extremely hard material has a materially increased cutting life. The speed of saw chains thus equipped can be materially raised over customary chain speeds. Given the present state of the art, this speed can be increased to an order of magnitude of from 20 to 40 meters per second.

The several features of the present invention enumerated above convert the motor driven chain saw into a tool capable of cutting and piercing even the hardest rock. Instead of natural rock, artificial stone, concrete and reinforced concrete can be cut by the chain saws of the invention, with the result that the present devices are eminently susceptible of use in emergencies, in the work of the army engineers etc.

In the drawings accompanying this application and forming part thereof, two embodiments of the invention are illustrated diagrammatically by way of example.

In the drawings,

Fig. 1 is a side view of a chain link including a follower cam, which replaces the reamer of saw chains used for wood cutting purposes;

Fig. 2 is a section along line A—A of the chain member of Fig. 1;

Fig. 3 shows one form of the bolt mounting the cutting bead;

Fig. 4 is a lateral view of a chain link having no follower cam, which replaces the cutting tooth of the wood sawing chain;

Fig. 5 is a section along line B—B of the chain member of Fig. 4;

Fig. 6 shows in section, the position of the chain links mounted on the guide rail;

Fig. 7 is a side view of a chain member including two cutting beads;

Fig. 8 is a lateral view of a chain link including four cutting beads;

Fig. 9 is a side view of a modification of the chain member of Fig. 8;

Fig. 10 is a side view of a chain member provided as a depth limiter;

Fig. 11 is a section along line C—C of the chain member of Fig. 10;

Figs. 12 and 13 are side views of approximately full scale chain portions incorporating some chain members according to the invention;

Fig. 14 is a side view, partly in section, of a part of a saw chain during operation in a groove of the rock.

Fig. 15 shows, drawn to a larger scale and in section, a grinding element of the chain having a clearance angle;

Fig. 16 is a similar view of a grinding element having no clearance angle, but instead an extended covering of diamond material;

Fig. 17 is a side view of a grinding element for piercing work;

Fig. 18 is a side view of a grinding element for simultaneous piercing and cutting operation;

Fig. 19 is a diagrammatic side view of the complete chain saw unit, and

Fig. 20 is a top view of the unit of Fig. 19.

Referring now to the drawings wherein like elements are denoted by identical reference numerals, and first to Fig. 1, the reamer tooth comprises a chain link body 1 of sheet steel which at the bottom, has a follower cam 2 and above the same, apertures 3 for the rivets. At the top, the body extends into lugs 4 which bend around the bolt 5. The bolt 5 supports, for rotary displacement, the cutting bead 6 which is prevented from being displaced longitudinally, by the washers 7. The cutting bead 6 may consist, for example, of a core of soft steel, the spherical exterior of which has a covering of granular hard metal welded or pressed on or otherwise attached to the surface. As seen in Fig. 3, the bolt 5 has on one side the head 9, extending therefrom the shaft 8, and at the bottom a groove 10 for engaging a locking ring. The bolt may be provided otherwise, e.g. as a plain rivet bolt the two heads of which are obtained by upsetting following assembly. The bolt 5 is positioned horizontally, i.e. parallel to the direction of cutting, as shown in Fig. 1, if the guide rail includes a guide roller for piercing work. The cutting bead 6 hardly ever turns as long as it passes across the guide rail, inasmuch as it engages the rock by a purely sliding, linear motion. When it reaches the guide roller, however, it will roll off, i.e. turn somewhat provided it contacts the rock not only at the top but also on one side, as here the pressure from the rock applies at an angle to the axis of the bolt 5. If there is no cutting, the bolt is inclined by an angle $\alpha\alpha$ with respect to the horizontal. Now the bead will turn somewhat even when sliding across the guide rail, i.e., it will not only glide but also roll, if it attacks the groove in the rock only on one side, i.e. has a small excentricity "$e$" as shown in Fig. 5. This excentricity is also desired in order to render the groove wider than the diameter of the cutting bead 6, i.e. to facilitate free cutting.

The chain member body 11 shown in Figs. 4 and 5 includes no follower cam.

The chain links are mounted like those of a normal triple sprocket chain for wood saws. The cam of the reamer 13 slides in the groove of the guide rail 12, whereas the chain members 14 and 15 are guided thereon, all three being united by the rivet 16, as seen in Fig. 6.

In order to increase the number of cutting beads per chain, each chain link can be provided with two cutting beads, as illustrated in Fig. 7. In this event, a center lug 17 surrounds the bolt between the two beads.

If still more, e.g. four grinding beads are to be arranged on a chain member, the arrangement requires modification as shown in Fig. 8. In order that all four grinding beads come into engagement on the guide roller, the beads 18 and 19 arranged in the center must have a larger diameter than the marginal beads 20 and 21. This, however, is unfavorable in most cases. Preferably, therefore, as shown in Fig. 9, a multiple-section, bent or curved bolt 23 is provided on a chain member body 22. When piercing into the rock, all the four cutting beads are stressed uniformly, during passage across the guide rail, however, the stress is on the two central beads only.

In order to avoid an excessive forcing into the groove in the rock, depth limiters according to Figs. 10 and 11 may be inserted between the working chain members. On top of a chain member body 24, a roof-shaped, curved surface 25 is disposed which may be lower e.g. by 0.2 mm., than the cutting beads. This prevents the cutting beads from ever penetrating more than 0.2 mm. into the rock so as to be stained excessively.

The saw chain of the invention can be provided e.g. as shown in Fig. 12. The grinding member 26 having a slight excentricity toward the right, is followed by a depth limiter 27, the grinding member 28 having a small excentricity toward the left mounted on the blind sprocket 29, again a depth limiter, 27, followed by a grinding member 26 without any excentricity, another depth limiter 27, whereupon the sequence is repeated.

Another arrangement is illustrated in Fig. 13. A cutting tooth 30 having two cutting beads with excentricity toward the right, is followed by a reamer tooth 31 without excentricity, a cutting tooth 33 with excentricity toward the left, another reamer tooth 31 with one cutting bead only, whereupon the sequence repeats itself. Preferably, the cutting teeth are associated with blind plates 32.

The depth limiters 27 can be replaced by chain members with worn cutting beads, or with beads lacking the hard metal covering. Many other combinations of the chain elements referred to, may be employed. Manifestly, chains embodying these chain members may be used in both cutting directions. In riveting, the known full rivets may be used as well as the equally known hollow rivets. The guide rails require no modification when used with the double or triple plate chains of the invention, nor do the chain drive gears or any other parts of the power chain saws. Double plate chains are as readily provided with the cutting beads of the invention as are triple plate chains.

Figs. 15 to 18 illustrate the embodiment of the invention where the chain members are provided as supports for grinding teeth. The grinding surface of these grinding teeth is formed by a solid grinding mass which incorporates diamond or carbide particles. This grinding mass is so shaped that it contacts the bottom of the cut groove over a wide area, without having any sharp edges.

The guide rail 43 which for sake of simplicity, is shown with a guide arch and not with a guide roller, has on its periphery, as usual with other triple plate chains, the groove 45. In contrast to known guide rails, it incorporates channels 44 for the supply of cooling and flushing water. In its simplest form, the chain itself comprises only two kinds of chain members which alternate: the grinding or cutting members 35, and the bilateral link plates 48. These are joined by the well known, readily exchangeable tubular rivets 34. The plates are designed as is customary in connection with tubular rivets, i.e. with cups turned inwardly to take up the pull. Every grinding member has, at the bottom, a follower cam 46, thereabove the side bar 41 with the readily exchanged rings 42, and above this the flange portion 36 on which the diamond embedding mass 37, which may consist of hard metal, steel, bronze, plastic or some special metal, is attached by welding, soldering or in some other suitable manner. The ring apertures 47 are traversed by the cups of the plates or side bars 48, and the tubular rivets 34.

If the cutting member 35 has the section shown in Fig. 15, it cuts itself loose always because of the clearance angle $\alpha'$ which, however, must be small.

With the modification according to Fig. 16, the diamond containing mass 37 projects on both sides which yields a still better free cut.

The grinding teeth can be provided with a continuous grinding surface, as shown in Fig. 14. With larger size chains, however, the grinding surface is discontinuous and interrupted by the slits 40 which are designed to receive, temporarily, the rock dust deriving from the grinding operation. The grinding tooth according to Fig. 17 is slightly arched on top. It is particularly adapted for piercing work with large curvature, and can rest with its entire top surface on the bottom of the groove. With a straight cut, of course, only its topmost central portion is utilized which results in uneven wear. If only a straight cut is contemplated, the arch of Fig. 17 is made very large, or else is replaced by a straight portion. If, however, straight cutting and piercing are to be effected at the same time, a grinding tooth such as that shown, by way of example, in Fig. 18 may be employed. In the straight portion of the cut, i.e. in the front of the guide rail, the diamonds mounted at the top of the central portions contact the groove fully. In front of the guide arch or the guide roller, however, the bilaterally rounded surfaces 38 come into complete contact with the rock. In this manner, during one revolution of the chain all diamonds are fully and evenly utilized for the grinding operation. If the diamond containing grinding mass 37 of hard metal is provided sufficiently thick, the grinding tooth of Fig. 17, after considerable wear, will approach the shape of that of Fig. 18.

In Fig. 14, the arrow R indicates the direction of displacement for piercing work, while the arrow R' indicates the direction when cutting upwardly and cutting free, at the same time, on the right flank. The latter procedure is the most customary method of sawing into rock such as that represented in Fig. 14.

The ground-off material, i.e. the rock dust, in time wears out the cheap plates 48, the rings 42 and the rivets 34 but these elements are quickly and inexpensively replaced, the tubular rivet 34 being readily pushed out on one side by a mandrel. The expensive grinding teeth 35, however, are not subject to any premature wear and have a long service life.

The large grinding faces resting on the bottom of the groove prevent the specific contact pressure from ever becoming excessive, a prerequisite for satisfactory operation common to all diamond bearing tools.

The cutting speed of the motor driven saw chains of the invention is materially higher than with the known wood saw devices, and may exceed by far 10 meters per second; speeds of 30–40 meters per second are contemplated. The present saw chains thus represent high capacity grinding tools which lend themselves to operation on the hardest rock.

Figs. 19 and 20 illustrate, schematically, the general assembly of a power chain saw according to the invention. The motor block 49 carries two grips. The motor may be an electro-motor or a gasoline engine. The motor drives the driving gear 52 over which the saw chain passes. The driving gear 52 is disposed on the outside of the gear case 53. The guide rail for the saw chain is shown at 43. A hose 54 is provided for feeding cooling or grinding liquid to the rail. At its free end, the guide rail carries a guide roller 55, replacing the guide arch shown in Fig. 14. The switch for operating the motor is preferably associated with the grip or handle 50.

I wish it to be understood that I do not desire to be limited to the exact details of construction, design and operation shown and described as numerous modifications falling within the scope of the following claims and involving no departure from the spirit of the invention nor any sacrifice of the advantages thereof, will be apparent to persons skilled in the art.

I claim:

1. Saw chain for power chain saws for cutting and piercing hard rock, comprising chain links provided with grinding elements and formed as supports for such grinding elements, lugs on the chain links, bolts supported in said lugs so as to extend in the direction of cutting, and cutting beads supported for rotary displacement on said bolts.

2. Saw chain according to claim 1 comprising bolts inclined with respect to the direction of cutting.

3. Saw chain according to claim 1 comprising a guide roller, and chain link supported bolts bent corresponding to the curved circumference of the guide roller.

4. Saw chain according to claim 1 comprising the following sequence of chain links: a cutting tooth involving two cutting beads with excentricity toward the right, a reamer tooth including a cutting bead without excentricity, a cutting tooth with two cutting beads with excentricity toward the left, and another reamer tooth, said sequence being repeated over the entire length of the chain.

5. Saw chain according to claim 1, comprising the following sequence of chain links: a link supporting a cutting bead with excentricity toward the right, a link supporting a cutting bead with excentricity toward the left, a link supporting a cutting bead with no excentricity, a depth limiter being inserted between any two components of this group.

6. Saw chain according to claim 5, wherein several sequences of chain link groups are provided, and a depth limiter is inserted between any two of such groups.

7. Saw chain according to claim 1, comprising a guide rail, and channels in the interior of said guide rail for the feeding of cooling and flushing liquid to the work.

8. Saw chain according to claim 1, wherein every cutting bead supporting chain link extends downwardly into a follower cam.

9. Power chain saw comprising in combination, a motor, driving gear means connected to said motor, a saw chain connected to said driving gear means, a guide rail carrying said saw chain on reversible sets of rollers, said saw chain including individual links bolted together, said saw chain links including ellipsoidally shaped cutting beads provided with hard abrasive coatings, and depth limiters arranged between the individual chain links.

10. Saw chain for power chain saws for cutting and piercing hard rock, comprising individual chain links bolted together, said chain links including ellipsoidally shaped cutting beads provided with hard abrasive coatings, and depth limiters arranged betwen the individual chain links.

11. Saw chain according to claim 10 wherein part of the cutting beads are disposed excentrically with respect to the axis of the cut groove.

12. Saw chain for power chain saws for cutting and piercing hard rock, comprising individual chain links bolted together, a plurality of cutting beads mounted on bolts in the direction of cutting, on each chain link.

References Cited in the file of this patent

UNITED STATES PATENTS

| | | |
|---|---|---|
| 624,400 | Surgi | May 2, 1899 |
| 651,330 | Harvey | June 5, 1900 |
| 771,065 | Hanley | Sept. 27, 1904 |
| 1,043,433 | Jackson | Nov. 5, 1912 |
| 2,155,584 | Bryant et al. | Apr. 25, 1939 |
| 2,589,015 | Merz | Mar. 11, 1952 |
| 2,679,839 | Metzger | June 1, 1954 |

FOREIGN PATENTS

| | | |
|---|---|---|
| 228,348 | Germany | June 23, 1909 |